P. W. PICK.
SANITARY NON-SPILLABLE MILK BUCKET.
APPLICATION FILED DEC. 23, 1919.
1,342,569. Patented June 8, 1920.
2 SHEETS—SHEET 2.
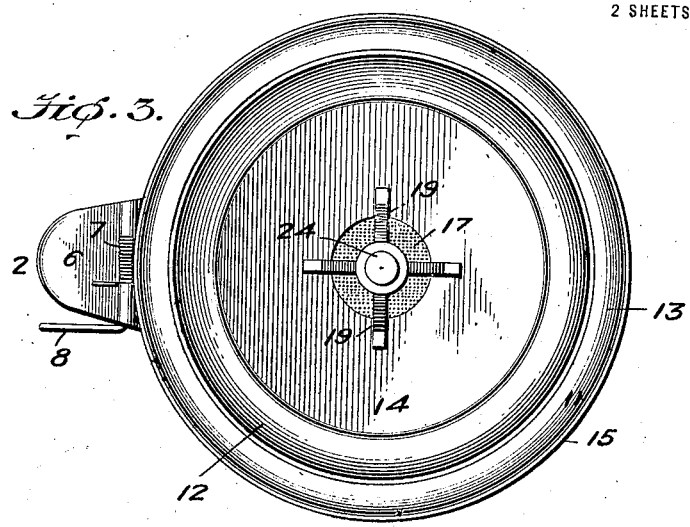
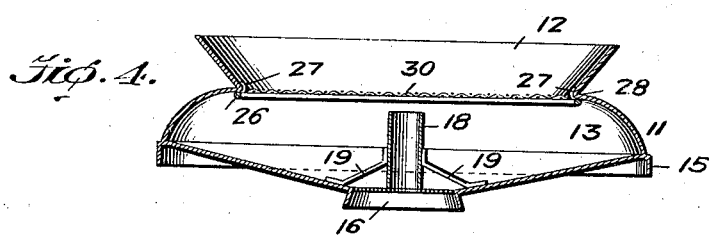
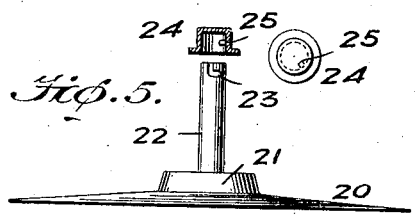
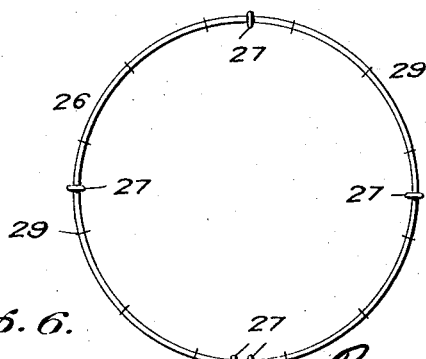
Inventor
Paul William Pick
by his Attorney

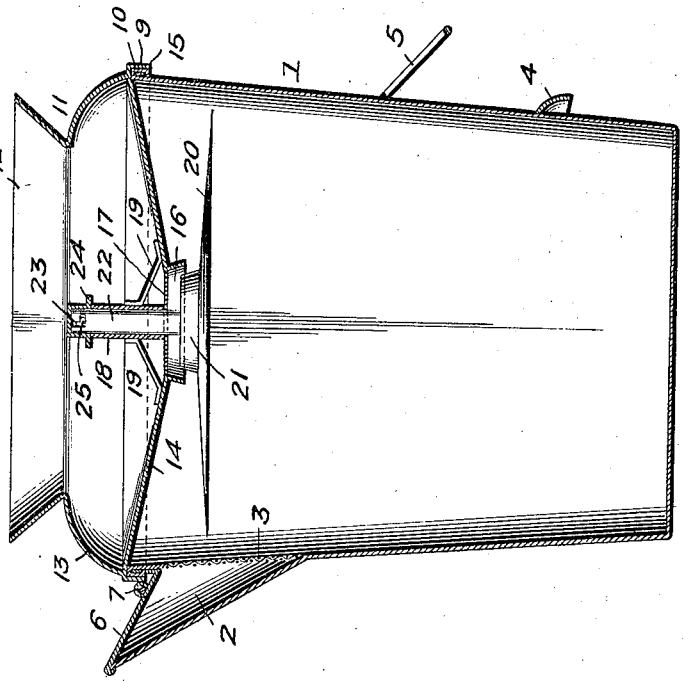

UNITED STATES PATENT OFFICE.

PAUL WILLIAM PICK, OF PORTLAND, OREGON.

SANITARY NON-SPILLABLE MILK-BUCKET.

1,342,569. Specification of Letters Patent. Patented June 8, 1920.

Application filed December 23, 1919. Serial No. 346,889.

*To all whom it may concern:*

Be it known that I, PAUL WILLIAM PICK, a citizen of the United States, residing at Portland, in the county of Multnomah and State of Oregon, have invented certain new and useful Improvements in Sanitary Non-Spillable Milk-Buckets, of which the following is a specification.

This invention relates to a sanitary non-spillable milk bucket and has for its objects, first, the provision of novel means whereby foreign material will be prevented from having access to the bucket; novel means for preventing the milk from spilling, should the bucket be overturned or dropped; and a novel arrangement of top which can be readily applied to or removed from the bucket and adapted and arranged for the convenient detachment of parts for the purpose of cleansing them.

Another object of the invention is the provision of an improved top for milk buckets having a form adapting it to catch the spray from the milk as it is poured into the bucket and prevent the spray from spattering outside the bucket.

A further object is the provision of a novel top for milk buckets comprising a concave bottom wall, an overhanging collar or part surmounting said wall and serving as a spray retainer or deflector, and a novel valve detachably carried by the bottom wall and coöperating with a seat thereon, the said structure being a unitary and self-contained arrangement which can be applied to or removed from the bucket. The valve is normally open, premitting the free entry of milk into the bucket and allowing the milk to be poured from the bucket through the usual spout, but said valve is so arranged and adapted that should the bucket be dropped or tipped, the pressure of the milk against the valve will cause the latter to close against the seat and prevent the milk from spilling.

The opening through the valve seat is provided with a gauze strainer which prevents hairs, dirt and foreign material from entering the bucket.

Another object of the invention is the provision of an attachable and removable supplemental strainer which may be applied to the upper part of the cover to initially strain the milk before it passes within the cover.

The invention is susceptible of modification and the disclosure hereinafter given and appearing in the drawings is to be considered as illustrative rather than restrictive of the scope of the invention.

In the accompanying drawings,

Figure 1 is a side elevation of the complete sanitary non-spillable milk bucket;

Fig. 2 a vertical section thereof;

Fig. 3 a plan view;

Fig. 4 a detail vertical section of the removable top or cover, the valve having been removed and the supplemental gauze strainer being shown applied;

Fig. 5 a detail side elevation of the valve, the retaining collar being shown detached and in section above the valve stem and at the side being shown in plan view, and Fig. 6, plan and side detail views of the spring ring for the supplemental gauze strainer of Fig. 4.

The milk bucket 1 is provided with the usual spout 2 having the gauze strainer 3. The bucket has the hand hold 4 and the usual bail 5. A cover 6 is provided for the spout 2 and is kept in closed position by a spring 7; the cover 6 can be opened by the handle 8.

The upper edge of the bucket 1 is bent around a circular reinforcing band 9 as shown at 10; this strengthens and renders rigid the mouth of the bucket so that the cover can fit snugly thereon.

My improved cover is shown generally at 11 and it is provided with a flared mouth 12 through which the milk may readily pass. Below the mouth 12 is the overhanging, preferably convex, portion 13 which has a concave or funnel shaped bottom 14. I do not limit the part 13 to the precise form shown as variations may be resorted to. A flange 15 depends from the cover and is adapted to fit snugly around the mouth of the bucket 1. The concave or funnel shaped bottom 14 causes the milk to drain through the center thereof where it passes into the bucket through the tapered valve seat 16. The valve seat is provided with a gauze strainer 17. Surmounting the bottom 14 and supported above the gauze strainer 17 is a tube 18 which is held by braces 19.

The valve 20 is of concavo-convex circular form and is provided with a tapered valve plug 21 which is adapted to fit in the tapered seat 16 when the valve is in raised position, thereby closing communication between the space above the bottom 14 and the interior of the bucket. The valve is provided with a stem 22 which has an L-shaped slot 23 in its upper end and said stem fits inside the tube 18 and is adapted to slide up and down therein.

A collar 24 fitting over the end of the stem 22, is provided with a pin 25 which is received in the slot 23. The collar 24 rests upon the upper end of the tube 18 and holds the valve in the suspended position shown in Fig. 2. By giving the collar 24 a turn, it can be detached from the stem 22 whereupon the valve may be removed, thus enabling thorough cleansing of the parts to be obtained.

Normally the parts are in the position shown in Fig. 2, the valve then being open. The milk entering through the mouth 12, strikes the bottom 14 and passes through the strainer 17 onto the upper sloping face of the valve 20. The plug 21 is circular in form and so is the valve body 20. Consequently, the milk passing down through the valve seat 16 readily drains off the periphery of the valve 20 and falls into the bucket. If, however, the bucket is dropped or tilted over on its side, the milk in the bucket strikes against the valve 20 and closes it, the valve plug 21 then entering the seat 16 and cutting off communication between the interior of the bucket and the inside of the cover 11; consequently, it is impossible to spill the contents of the bucket. The spout 2 being closed by the cover 6, the milk cannot pass out through the spout when the bucket is dropped or tilted.

The form of the part 13 insures that milk spattering up from the bottom 14 will strike against said part 13 and be deflected back onto the bottom instead of spattering out of the mouth of the bucket.

The entire cover, together with the valve as shown in Fig. 2, can be removed from the bucket as a unit and cleansed or the valve taken out. Similarly, the said cover and valve may be applied as a unit to the bucket.

As it may be found of advantage to preliminarily strain the milk before it strikes the bottom 14, I provide the supplemental strainer shown in Figs. 4 and 6, comprising a split spring ring 26 having hooks 27 to engage the cover where the parts 12 and 13 join, as shown at 28. The ring has small hooks 29 which engage the gauze 30. The entire ring can be quickly applied to the cover and, after milking has been completed, it may be removed and cleansed.

The cover 11 may be detachably secured to the bucket in any preferred way; a bayonet joint 30' being shown for that purpose, but without limitation to this particular fastening means.

What I claim is:—

1. A cover for a milk bucket comprising an inclined or funnel shaped bottom wall, an overhanging portion surmounting said bottom wall, a valve seat at the center of the bottom wall, a valve stem guide carried by the cover, a valve having a stem slidable in the guide, and a removable collar connected to the stem and adapted to rest on the guide to hold the valve in suspended position.

2. A cover for a milk bucket comprising an inclined or funnel shaped bottom wall, an overhanging portion surmounting said bottom wall, a valve seat at the center of the bottom wall, a valve stem guide carried by the cover, a valve having a stem slidable in the guide, and a removable collar connected to the stem and adapted to rest on the guide to hold the valve in suspended position, said valve having an enlarged body adapted to receive the pressure of the milk for the purpose of closing the valve if the bucket is dropped or overturned.

3. A milk bucket provided with a cover having a valve seat through which the milk may pass to the interior of the bucket, a guide carried by the cover, a valve stem slidable in said guide, a removable collar connected to said stem and adapted to rest on the guide, and a valve for said seat, said valve having a face of relatively great area located inside the bucket in position to receive the pressure of the milk when the bucket is dropped or tilted for the purpose of causing the valve to close.

In testimony whereof I affix my signature.

PAUL WILLIAM PICK.